Aug. 21, 1962 J. WERNER 3,050,336
SLIDING ROOF FOR MOTOR VEHICLE OR THE LIKE
Filed July 21, 1959 2 Sheets-Sheet 1
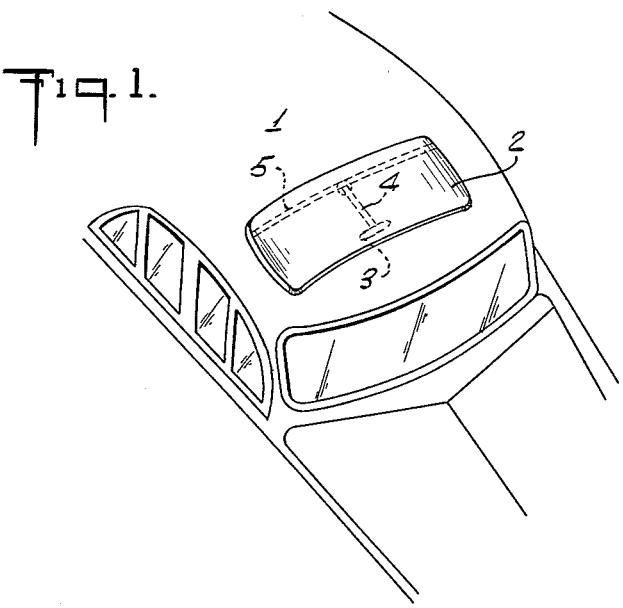
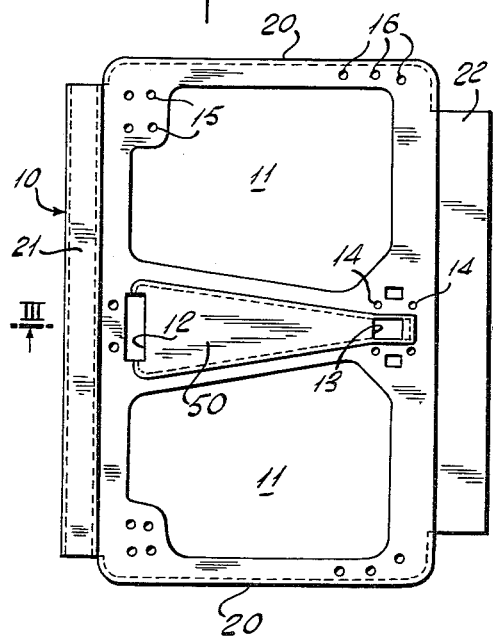
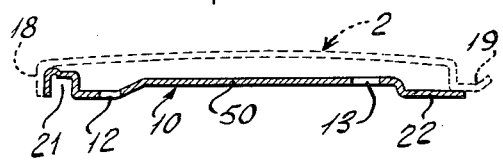
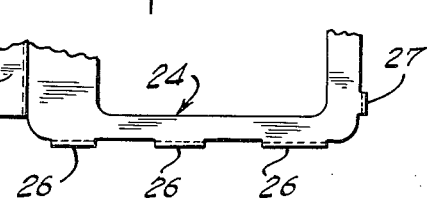
INVENTOR.
JOHANNES WERNER
BY
Nolte & Nolte
ATTORNEYS

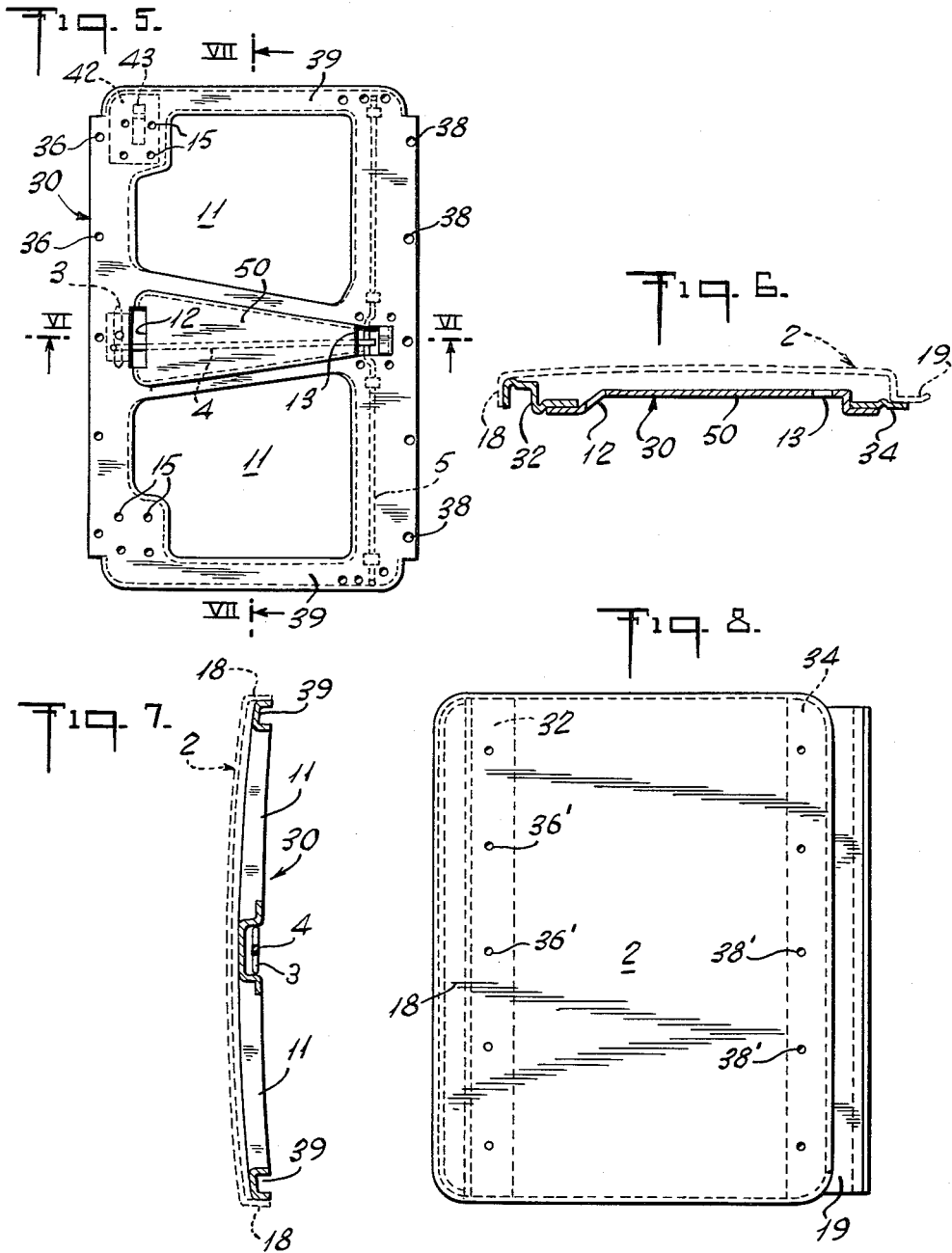

United States Patent Office 3,050,336
Patented Aug. 21, 1962

3,050,336
SLIDING ROOF FOR MOTOR VEHICLE
OR THE LIKE
Johannes Werner, Offenbach, Germany, assignor to H. T.
Golde G.m.b.H. & Co. K.G., Frankfurt, Germany
Filed July 21, 1959, Ser. No. 828,614
Claims priority, application Germany July 22, 1958
4 Claims. (Cl. 296—137)

The invention relates to a sliding roof for motor vehicle roofs or the like.

It is known for sliding roofs which have to be adapted to the curvature of the actual vehicle roof in question to be stiffened with transverse bars adapted to the curvature, and to provide additional edges and edge stiffenings for the purpose of stiffening the cover made of thin sheet metal to such an extent that it can be guided satisfactorily and have a high resistance to deformation. The pre-shaped sliding roof requires extensive welding work in order to achieve this. The transverse bars and/or other stiffening elements are at the same time so constructed that they can be used for mounitng the necessary fittings for guiding the roof, locking the roof, or for accommodating the roof drive. Consequently, these reinforcing elements often are of a very complicated shape.

The object of the invention is to increase the strength of the sliding roof and reduce the working time required for the final fitting of the roof, and it proposes that the sliding roof forms, together with an insert piece or stiffening member, a self-supporting shell construction. The insert piece can be made in one piece and with stiffening profiled portions, and is preferably provided with all the holes necessary for mounting the fittings.

According to a further feature of the invention, the insert piece is not connected directly to the sliding roof but an intermediate frame is rigidly fixed to the sliding roof, which comprises holes for screwing on the insert piece. This construction permits the separate finishing of the insert piece with all the guiding and operating elements which are to be mounted thereon, without any risk of these elements being damaged by the high temperatures occurring whilst the roof is being painted; for in this case only the intermediate frame is fixed on the sliding roof during the painting work, and the pre-assembled insert piece is subsequently connected to the said frame, preferably by screws or the like, so that it can easily be released for repair work.

This intermediate frame generally does not need to extend over all four sides of the sliding roof. Generally it is adequate, in order to obtain the necessary strength, if only two opposite sides of the sliding roof are equipped with suitable sections for mounting the insert piece.

A particular advantage of the sliding roof construction with an insert piece according to the invention is also seen to reside in the fact that the insert piece can be used, with all the mechanical elements mounted thereon, as a standard component for vehicles of different roof curvatures, which constitutes an enormous simplification particularly in the subsequent fitting of sliding roofs to vehicles of many different kinds.

The invention will be explained hereinafter with reference to some examples of embodiment and with the help of the drawings, wherein:

FIGURE 1 is a perspective partial view of a motor vehicle roof comprising a sliding roof portion, the operating device being indicated schematically, FIGURE 2 is a view from above of an insert or stiffening piece according to the invention which is to be fixed rigidly to the underside of the sliding roof according to FIGURE 1 and which forms together with the said roof a rigid shell construction, FIGURE 3 is a sectional view taken on the line III—III of FIGURE 2, FIGURE 4 is a partial view of a modified form of embodiment of an insert piece according to FIGURE 2, FIGURE 5 is a view from above of a further form of embodiment of an insert piece which in contrast to FIGURE 2 is fixed not directly to the sliding roof but by way of a front intermediate frame and a rear intermediate frame, FIGURE 6 is a sectional view taken on the line VI—VI of FIGURE 5, also showing the additional frames, and showing the position of the sliding roof in dotted lines, FIGURE 7 is a sectional view through the insert piece taken on the line VII—VII of FIGURE 5 and indicating the position of the sliding roof, and FIGURE 8 is a view from above of a sliding roof with dotted lines indicating the intermediate frames for mounting an insert piece according to FIGURES 5 to 7.

In FIGURE 1, 1 designates the fixed vehicle roof in which a sliding roof 2 is inserted in a reciprocable manner. Dotted lines illustrate the position of an operating device for the sliding roof. This device consists of a handle 3 which operates a lever mechanism 4, 5. By means of the handle 3, it is possible to carry out the shifting of the sliding roof 2, the lifting and lowering of its rear edge, the locking of its front edge in the closed position, and the like, although naturally it would be possible to replace the hand operation by automatic operation by means of an electric motor. In addition to the said operating devices, guide elements must be attached to the sliding roof for the longitudianl displacement thereof, and it will be seen that the arrangement of all these individual elements on the sliding roof requires a considerable amount of work, especially since the elements have to be adapted as regards their position to the curvature of the sliding roof 2 both in the longitudinal and the transverse directions of the vehicle.

According to the invention there is arranged below the sliding roof an insert piece or stiffening member, for example as shown at 10 in FIGURE 2, which is rigidly connected to the sliding roof so that it forms together with the said sliding roof a self-stiffened shell construction. This piece 10 consists substantially of a profiled metal sheet whose length and width are adapted approximately to those of the sliding roof 2. The large openings 11 are merely for economizing in material and reducing weight, whilst smaller openings and holes 12 to 16 are arranged on the insert piece 10 so that all the fittings for operating and guiding the sliding roof can be arranged on the insert piece 10.

Thus, for example, in the form of embodiment shown in FIGURE 2, openings 12 and 13 are provided for the passage of projecting parts of the control rod 4, and holes 14 for screwing-on supports for the control lever mechanism 4, 5 and holes 15, 16 for fixing supports for the front and rear guide elements of the sliding roof. The number, arrangement and form of the holes required depends of course, in individual cases, on the selected method of operating the sliding roof. Generally, however, it is readily possible to use the same insert piece 10 for different kinds of operating systems—for example hand-operated or electrically operated systems—and for all the holes for attaching the operating means for hand and motor drive to be arranged on the said piece. Then in each case the fitter only uses those holes which are intended for the kind of drive which has been selected. As a result, the insert piece 10 can be manufactured as a standard component for a large number of roof types and at the same time for various kinds of roof drives. Whereas hitherto the individual operating elements which had to be fixed on the sliding roof 2 had to be shaped in accordance with the roof curvature or subsequently adjusted, this work is no longer necessary if the operating and guide elements are arranged on the insert piece 10, since in contrast to the sliding roof 2, which is visible from the exterior, this insert piece does not have to be shaped exactly in accordance with the curvature of the actual vehicle roof 1.

The insert piece 10 which can also be constructed as a solid shell without the openings 11 comprises along its four edges a stiffening profile whose flanges serve at the same time for the rigid connection of the insert piece 10 to the sliding roof 2. The roof 2 comprises a peripheral downwardly directed flange 18 to which is connected, along the rear edge, the usual rain-collecting gutter 19. The insert piece 10 is provided along its side edges also with downwardly directed flanges 20, whereas the front edge 21 is given a U-shaped cross-section in order to strengthen the construction of the sliding roof, and the rear edge comprises a broad flange 22 which engages below the rain-collecting gutter 19 of the sliding roof. Substantially along the middle of the insert piece 10 there extends a rearwardly tapering profiled portion 50 which has the cross-section of an inverted U. This is used on the one hand for stiffening purposes and at the same time for accommodating the operating rod 4 which acts as a crank.

In the embodiment according to FIGURES 2 and 3, the sliding roof 2 and the insert piece 10 are welded together at all four edges, but instead of welding it is also possible to use screws or some other rigid connection.

FIGURE 4 shows a modified form of the insert piece or stiffening member 10 according to FIGURE 2. In this case the insert piece 24 is not provided with a continuous edge flange 20 but instead comprises only a few fastening tongues 26 for connection to the side edges of the sliding roof 2, and tongues 27 for connection to the rear edge of the sliding roof 2 outside the region of the gutter 19, whereas further (not shown) straps on the insert piece 24 can be provided for fixing to the gutter 19 of the sliding roof 2.

Before insertion in the fixed vehicle roof 1, the sliding roof 2 is painted. If during this operation the sliding roof is connected to the insert piece 10 or 24 with all the attachments, there is a risk that the great heat necessary for drying the paint will cause damage to the operating and guiding elements mounted on the insert piece 10 or 24. More particularly, parts of the lock in the region of the handle 3 and any sliding surfaces of felt or leather which may be provided on the guide elements may become damaged.

Naturally, it is possible to arrange the delicate parts subsequently on the sliding roof 2 once it has been painted and provided with the insert piece 10 or 24. However, it is particularly advantageous to have a construction such as is shown for example in FIGURES 5 to 8. The insert piece or stiffening member 30 is here made somewhat shorter than the insert piece 10 and is not connected directly to the roof 2 but is rigidly connected through the agency of front and rear supporting rails 32 and 34. The rails 32 and 34 can be regarded as two sides of a stiffening frame which, if appropriate, can also be made to extend about all four sides of the sliding roof 2. Generally, however, it will be adequate to provide the rails 32, 34 at two sides in order to fix the insert piece 30 and to obtain the desired rigidity for the entire sliding roof construction. Otherwise, the construction of the insert piece 30 corresponds substantially to that of the piece 10. However, the piece 30 is provided along the front and rear edges with additional holes 36, 38 which register with holes 36′, 38′ of the supporting rails 32, 34. Whilst the frame parts 32, 34 can be welded to the sliding roof 2 in a simple manner, the insert piece 30 is releasably connected to the frame parts 32, 34 by screws through the holes 36, 36′, 38, 38′, after the painting of the sliding roof 2 has been completed, so that there is no danger of any elements mounted on the insert piece 30 being damaged due to the action of heat. If appropriate, the insert piece 30 can also be welded to the parts 32, 34. Generally, however, a releasable connection of these parts is particularly advantageous should repairs to the operating and guiding elements mounted on the insert piece 30 prove necessary.

FIGURE 7 is a cross-sectional view of the insert piece 30 which comprises at both sides U-shaped stiffening portions 39 whose outer limbs bear against the flanges 18 of the sliding roof 2 without any welded or screw connection being provided here, since in the present case the sliding roof 2 can be connected satisfactorily to the insert piece 30 by screws at 36, 38. However, where appropriate, according to the invention it is also possible to replace the frame parts 32, 34 by an intermediate frame extending over three or four sides, this intermediate frame being expediently welded at all sides to the sliding roof 2 and screwed to the insert piece 30.

FIGURE 5 also shows the position of the operating rods 4, 5 and of the handle 3, and in the region of the holes 15 there is screwed-on a supporting plate 42 which carries a guide shoe 43 for the longitudinal displacement of the sliding roof 2 on the vehicle roof 1.

The invention is not, of course, restricted to details of the examples of embodiment which have been described, and more particularly the insert piece can be given a completely different form from that which is shown here. What is essential is that an insert piece or stiffening member is connected to the sliding roof at the edge of the latter to form a shell-like construction. The insert piece is constructed so as to support the operating and guiding elements of the sliding roof, it being possible to connect the said insert piece either directly or indirectly to the sliding roof.

I claim:

1. A rigid sliding roof panel for motor vehicles, comprising a self-supporting hollow shell construction having an upper planar roof member and a lower substantially planar stiffening member, both of said members being constituted by prefabricated one-piece rigid stampings having substantially aligned rigid peripheral flange portions, said flange portions of the upper roof member being secured to said flange portions of the lower stiffening member along at least two edges of the roof panel, whereby the hollow shell construction lends the sliding roof panel increased stability without increasing the weight of either of the members.

2. A rigid sliding roof panel according to claim 1, further comprising an intermediate frame firmly secured to said roof member, and means for releasably connecting said intermediate frame to said stiffening member.

3. A rigid sliding roof panel according to claim 2, wherein said intermediate frame only extends along the front and rear edges of said roof member, leaving the side edges thereof free.

4. A rigid sliding roof panel according to claim 2, wherein said roof member has a frontal bent-over edge extending downwardly and a rear portion shaped into a rain-collecting gutter, the front part of said intermediate frame having a portion in the shape of an inverted U fixed to said bent-over edge of and a substantially horizontal rear flange attached to said gutter.

References Cited in the file of this patent

UNITED STATES PATENTS

| | | |
|---|---|---|
| 1,981,843 | Mobbs | Nov. 20, 1934 |
| 2,245,832 | Simpson | June 17, 1941 |
| 2,338,309 | Votypka | Jan. 4, 1944 |